United States Patent [19]

Merron

[11] 4,307,621

[45] Dec. 29, 1981

[54] SWING DRIVE ASSEMBLY FOR MACHINES HAVING ROTATABLE FRAMES

[75] Inventor: Thomas S. Merron, Marion, Ohio

[73] Assignee: Dresser Industries, Inc., Dallas, Tex.

[21] Appl. No.: 107,570

[22] Filed: Dec. 27, 1979

[51] Int. Cl.³ .......................... F16H 1/20; A47B 91/00
[52] U.S. Cl. .............................. 74/421 A; 37/118 R; 212/248; 248/349; 74/397
[58] Field of Search .................... 37/115-118, 37/DIG. 7, 103; 212/247, 248, 253, 179, 180; 74/421 A, 395-397, 415, 401; 248/650, 656, 419, 422, 425, 188.2, 188.3, 188.4, 349

[56] References Cited

U.S. PATENT DOCUMENTS

| | | | |
|---|---|---|---|
| 1,786,192 | 12/1930 | Cullman | 74/397 |
| 2,035,385 | 3/1936 | McLean | 212/253 |
| 2,235,179 | 3/1941 | Tangen | 74/397 |
| 2,346,900 | 4/1944 | Black | 212/247 X |
| 2,500,815 | 3/1950 | Gerli et al. | 212/247 X |
| 2,852,149 | 9/1958 | Bruneri et al. | 212/247 X |
| 3,539,053 | 10/1970 | Lado et al. | 212/248 |
| 3,662,623 | 5/1972 | Lorence | 212/247 X |
| 3,739,652 | 6/1973 | Caldwell et al. | 212/247 X |
| 3,949,881 | 4/1976 | Morrow, Sr. et al. | 212/247 |
| 4,216,870 | 8/1980 | Bonneson et al. | 212/253 X |

FOREIGN PATENT DOCUMENTS

| | | | |
|---|---|---|---|
| 243841 | 3/1963 | Australia | 212/253 |
| 156909 | 11/1956 | Sweden | 212/253 |
| 916231 | 1/1963 | United Kingdom | 212/247 |
| 529993 | 1/1977 | U.S.S.R. | 212/253 |

*Primary Examiner*—E. H. Eickholt
*Attorney, Agent, or Firm*—Gerald L. Lett

[57] ABSTRACT

In a machine having a lower frame, an upper frame having at least one upright wall section, rotatably mounted on the lower frame, and a ring gear mounted on the lower frame, an assembly for swinging the upper frame relative to the lower frame comprising a drive unit mountable on the upright wall section, having a pinion drivingly engageable with the ring gear, means for adjusting the lateral displacement of the drive unit relative to the upper frame, correspondingly adjusting the lateral displacement between the meshing teeth of the pinion and the ring gear, means for adjusting the vertical displacement of the drive unit relative to the upper frame, correspondingly adjusting the vertical displacement of the meshing teeth, providing proper alignment of the meshing teeth and full bearing contact therebetween, and means for rigidly securing the drive unit to the upper frame upon effecting proper adjustment of the displacements between the drive unit and the upper frame.

10 Claims, 5 Drawing Figures

FIG. I.

SWING DRIVE ASSEMBLY FOR MACHINES HAVING ROTATABLE FRAMES

This invention relates to a machine having a lower frame, an upper frame rotatably mounted on such lower frame and a ring gear mounted on the lower frame, and particularly to a drive unit mountable on such an upper frame, having a pinion drivingly engageable with such a ring gear.

In most conventional types of heavy-duty excavating machines, there usually is provided a lower frame, an upper frame rotatably mounted on such a lower frame, a ring gear mounted on the lower frame, and at least one drive unit mounted on the upper frame, having a pinion drivingly engageable with the ring gear, which may be operated to swing the upper frame. Traditionally, such swing drive units have been flange mounted on the deck of the upper frame with the pinion shaft thereof extending through vertical openings in the upper frame at the manufacturing site of the machine. Such mounting arrangement has been found not to be entirely satisfactory in that it requires precise machining of the upper frame for mounting the swing drive unit and assuring proper alignment of the pinion shaft with the ring gear.

The precise machining of the upper frame and the alignment of the pinion shaft with the ring gear involves a comparatively high manufacturing cost. It thus has been found to be desirable to provide a swing drive unit for the type of machine as described which can be effectively and economically installed in a machine in the field and properly aligned with the ring gear of the machine to provide full bearing contact between the teeth of the meshing gears and correspondingly provide maximum efficiency in torque transmission.

Accordingly, it is the principal object of the present invention to provide an improved swing drive unit for a machine.

Another object of the present invention is to provide an improved swing drive unit for a heavy-duty machine, such as a dragline, mining shovel and the like.

A further object of the present invention is to provide an improved swing drive assembly for a heavy-duty machine having a lower frame, an upper frame rotatably mounted on the lower frame and a ring gear mounted on the lower frame adapted to be engaged by a pinion of such a swing drive unit.

A still further of the present invention is to provide an improved swing drive unit for a heavy-duty machine, such as a dragline, mining shovel and the like, which eliminates the necessity of mounting such a unit on the deck of the upper frame of the machine in the traditional manner.

Another object of the present invention is to provide an improved swing drive unit for a heavy-duty machine which eliminates the necessity of precise machining for assuring proper alignment of the pinion of such a unit with the ring gear of the machine.

A further object of the present invention is to provide an improved swing drive unit for a heavy-duty machine having a lower frame, an upper frame rotatably mounted on the lower frame and a ring gear mounted on the lower frame adapted to be engaged by a pinion of such a unit, wherein the unit may be mounted on the upper frame without any machining of the upper frame to accommodate the drive unit, and the pinion thereof may be easily aligned with the ring gear to provide full bearing contact between meshing teeth and correspondingly efficient torque transmission.

Another object of the present invention is to provide an improved swing drive unit which may be easily and economically mounted and removed from the upper frame of a machine.

Other objects and advantages of the present invention will become more apparent to those persons having ordinary skill in the art to which the present invention pertains from the following description taken in conjunction with the accompanying drawings wherein.

Figure 1:
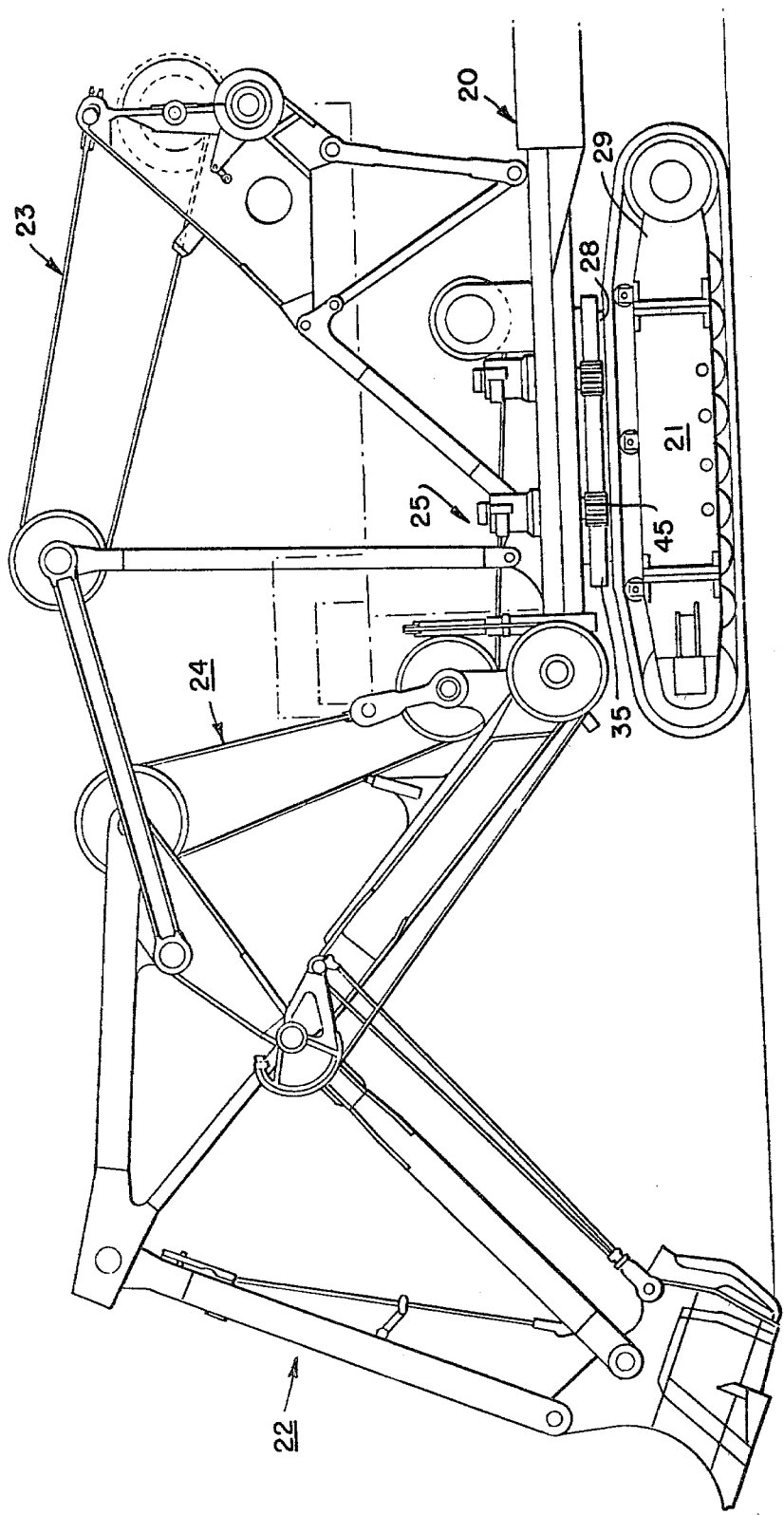
FIG. 1 is a side elevational view of a mining shovel incorporating an embodiment of the present invention.
Figure 2:
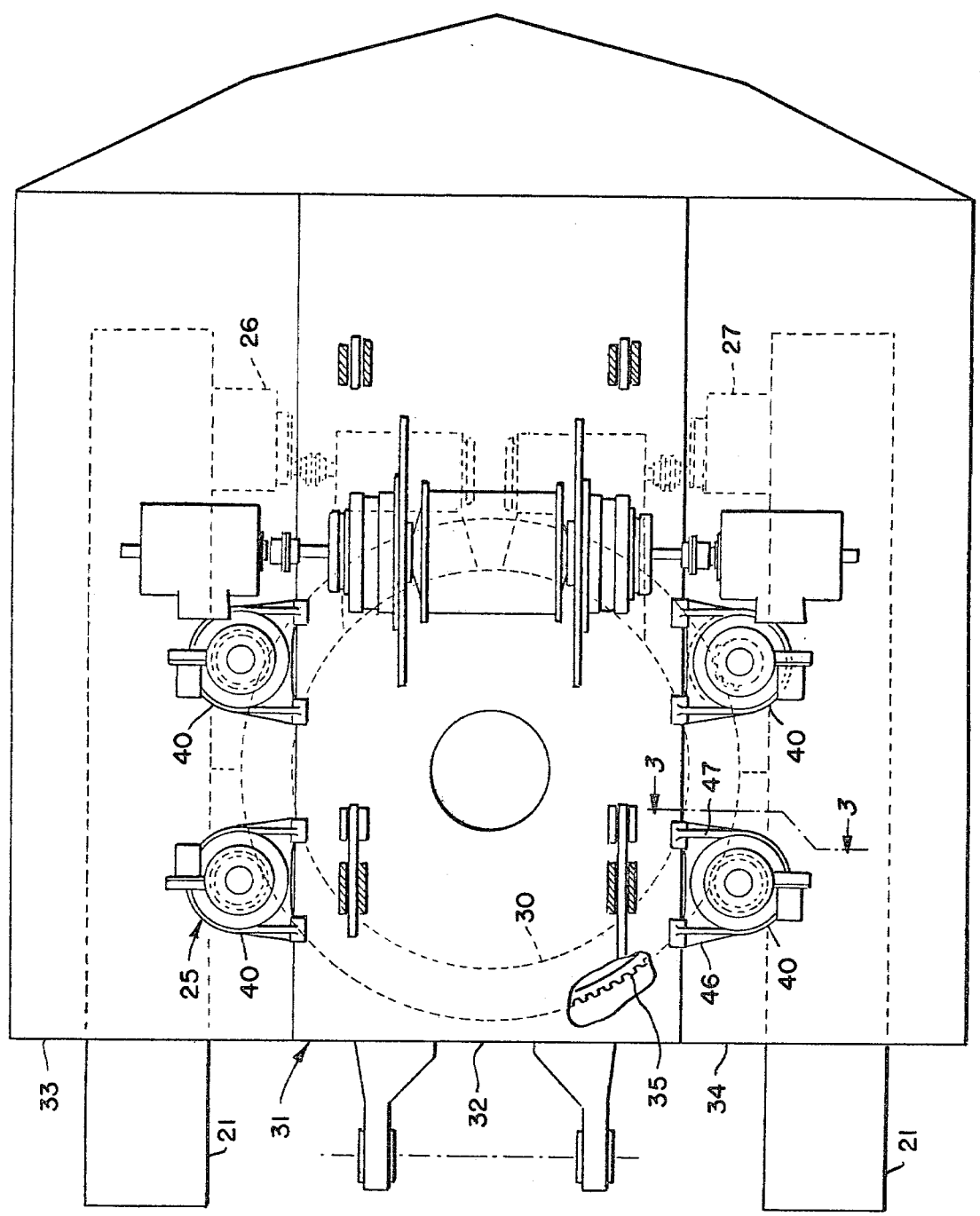
FIG. 2 is an enlarged top plan view of an upper deck of the machine shown in FIG. 1, illustrating the arrangements of various drive assemblies thereon.

Referring to FIGS. 1 and 2 of the drawings, there is illustrated a mining shovel utilizing an embodiment of the present invention which generally includes a main support unit 20 mounted on a pair of crawler units 21, a front end assembly 22 mounted on the front end of the main support unit, a crowd system 23 mounted on the main support unit and operatively connected to the front end assembly, a hoist system 24 mounted on the main support unit and operatively connected to the front end assembly, a swing system 25 mounted on the main support unit, crawler drive assemblies 26 and 27 mounted on the rear end of the main support unit and the rear ends of crawler units 21, and appropriate power supplies and controls mounted on the main support unit for operating such various systems and assemblies.

Main support unit 20 generally consists of a lower frame 28 mounted on crawler frames 29, a live roller circle 30 and an upper frame 31. The upper frame consists of an intermediate frame section 32 supported on the roller circle on which the bulk of the static and dynamic loads of the machine are imposed, and a pair of laterally projecting wing sections 33 and 34 which overlie the crawler units. Lower frame 28 is provided with a ring gear 35 which is disposed concentrically with live roller circle 30. Live roller circle 30 consists of a lower circular rail 36 mounted on the lower frame, an upper circular rail 37 mounted on the underside of upper frame 31 and a plurality of rollers 38. The rollers are supported on shafts carried by a cage structure 39. As best illustrated in FIG. 3, rollers 38 are supported on lower rail 36 and upper rail 37 is supported on the rollers so that the upper frame can be rotated or swung relative to the lower frame about the vertical center line of the live roller circle.

Front end assembly 22, crowd system 23 and hoist system 24 do not form a part of the present invention. The construction and operation of such assembly and systems are described in detail in U.S. Patent Application, Ser. No. 950,004, filed Oct. 6, 1978, which application has been assigned to the assignee of the present invention.

The system for swinging the upper frame relative to the lower frame on the live roller circle consists of a number of swing units 40 which embody the present invention. Each of the swing units is mounted on the upper frame and is provided with a pinion drivingly engaging ring gear 35 on the lower frame. Any suitable number of such units can be used although an even number of such units symmetrically positioned preferably should be used. In the machine shown in FIGS. 1 through 3, four of such units are used, arranged symmetrically to provide a uniform load on the machine.

Figure 3:
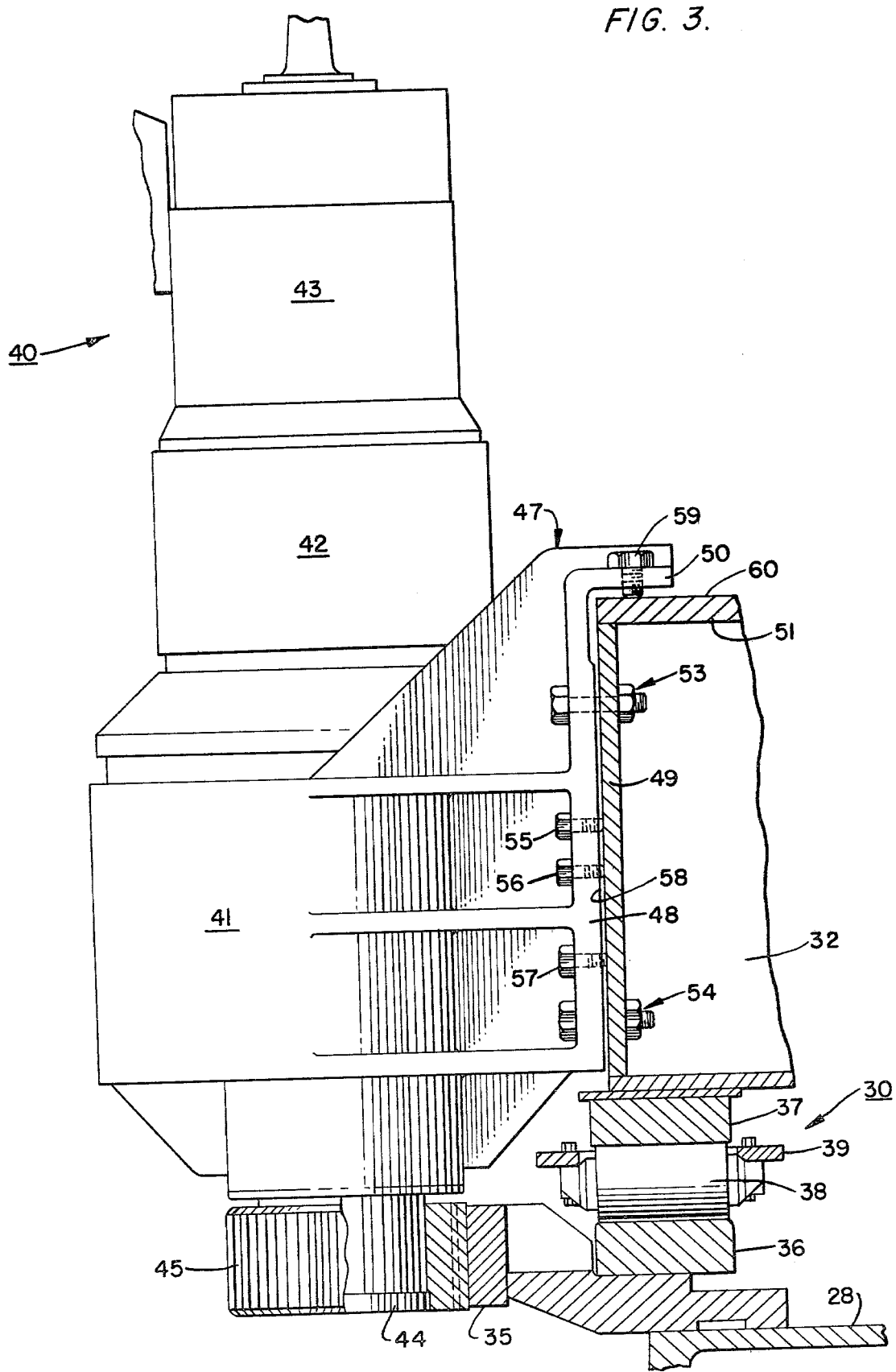
FIG. 3 is an enlarged cross-sectional view taken along line 3—3 in FIG. 2.

Referring to FIG. 3, there is illustrated a swing drive unit which basically consists of a lower housing 41 mounted on a side of intermediate frame section 32 of the upper frame, an intermediate housing 42 mounted on lower housing 41 and an upper housing 43 mounted on intermediate housing 42. Mounted in lower housing 41 is a vertically disposed pinion shaft 44 having a pinion 45 drivingly engaging ring gear 35 and a reduction gear train operatively connected to the upper end of the pinion shaft. Intermediate housing 42 contains a flexible coupling which is operatively connected to the gear train mounted on the upper end of the lower housing. The pinion shaft is driven through the coupling and gear train by an electric motor mounted in upper housing 43. The details of the drive train of swing unit 40 are more fully illustrated and described in the aforementioned U.S. Patent Application, Ser. No. 950,004, filed Oct. 6, 1978.

Referring to FIGS. 2 and 3, each of swing drive units 40 is provided with a pair of spaced brackets 46 and 47 which are substantially similar in construction and which are utilized to mount the swing drive unit on the intermediate section of the upper frame. As best illustrated in FIG. 3, bracket 47 is provided with a substantially upright flange portion 48 adapted to be positioned adjacent vertical plate member 49 of the intermediate frame section of the upper frame and an upper lateral flange portion 50 adapted to overlie upper plate 51 of the intermediate frame section when the drive unit is mounted on the upper frame with pinion 45 meshing with ring gear 35. The drive unit is rigidly secured or clamped to the intermediate frame section by a set of bolts and nuts 53 and 54. The bolts of such fasteners project through oversized openings in upright flange portion 48 to permit the drive unit to be displaced vertically relative to the intermediate frame section when the pinion shaft is being aligned with the ring gear.

Lateral displacement of the drive unit relative to the intermediate frame section and correspondingly lateral displacement of pinion 45 relative to ring gear 35 may be adjusted by a set of set screws 55, 56 and 57 which are threaded in horizontal threaded openings in upright flange portion 48 and have end portions engaging an outer surface 58 of vertical plate member 49. Vertical displacement of the drive unit relative to the intermediate frame section may be adjusted by means of a set of set screws 59 which are threaded through vertical threaded openings in upper flange portion 50 and have end portions engaging upper surface 60 of upper plate 51.

To avoid undue wear of the pinion and ring gear teeth and further provide for efficient torque transmission, the pinion shaft should be properly aligned with respect to the ring gear and the teeth of the pinion should have full bearing contact with the teeth of the ring gear. To provide proper alignment of the pinion shaft and proper meshing of the gear teeth, set screws 55 through 57 and 59 may be screwed in or backed off to displace the drive unit relative to the frame section and correspondingly the pinion relative to the ring gear, vertically and laterally.

In mounting the drive unit and aligning the pinion relative to the ring gear, the drive unit is first attached to the frame section with the adjusting screws backed off and the clamping bolts tightened snugly. The alignment of the pinion relative to the ring gear is then checked by using feeler gauges along the face width of the meshing gears. If necessary, the pinion may be displaced vertically or laterally by adjusting the set screws. The unit is then shimmed as may be required and the clamping bolts are tightened. The pinion is then spray coated with a conventional blueing material and permitted to dry. After the coating material has dried, the machine is swung slowly under a light load to permit the coated teeth of the pinion to engage the ring gear. The contact pattern of the pinion is then checked to ascertain the loading on the pinion and further adjustment is made and the checking procedure is repeated until such time that a uniform pattern on the pinion teeth indicates a uniform loading on the pinion. A further check of the alignment is made after the machine has been operated under full swing load to determine if shaft deflection has altered the contact pattern of the gears. If so, further adjustment may be made, as discussed.

Figure 5:
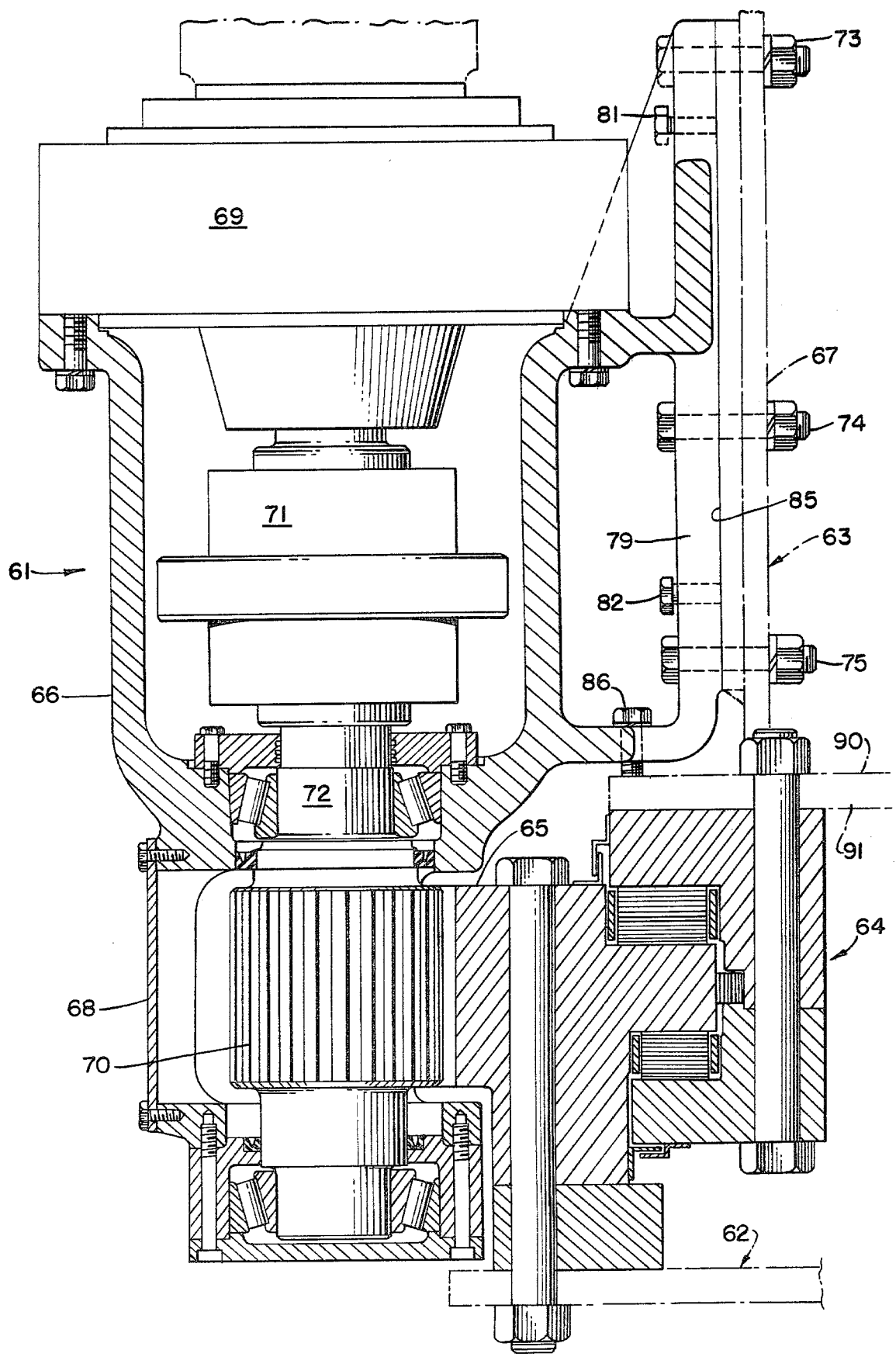
FIG. 5 is a cross-sectional view taken along line 5—5 in FIG. 4.

FIGS. 5 and 6 illustrate an embodiment of the invention as applied to a hydraulic swing unit 61 mounted on a machine having a lower frame 62, an upper frame 63 and a slewing ring 64 provided with a ring gear 65. The unit includes an intermediate housing 66 mounted on a vertical plate member 67 of the upper frame, a depending lower housing 68 and an upper housing 69. Mounted in upper housing 69 is a hydraulic motor which drives a pinion 70 through a coupling 71 and a pinion shaft 72. The pinion is drivingly engaged with ring gear 65 so that when the fluid motor is operated, the interaction of the pinion with the ring gear will cause the upper frame to rotate relative to the lower frame in the conventional manner of swinging the upper frame in large, heavy-duty machines.

Figure 4:
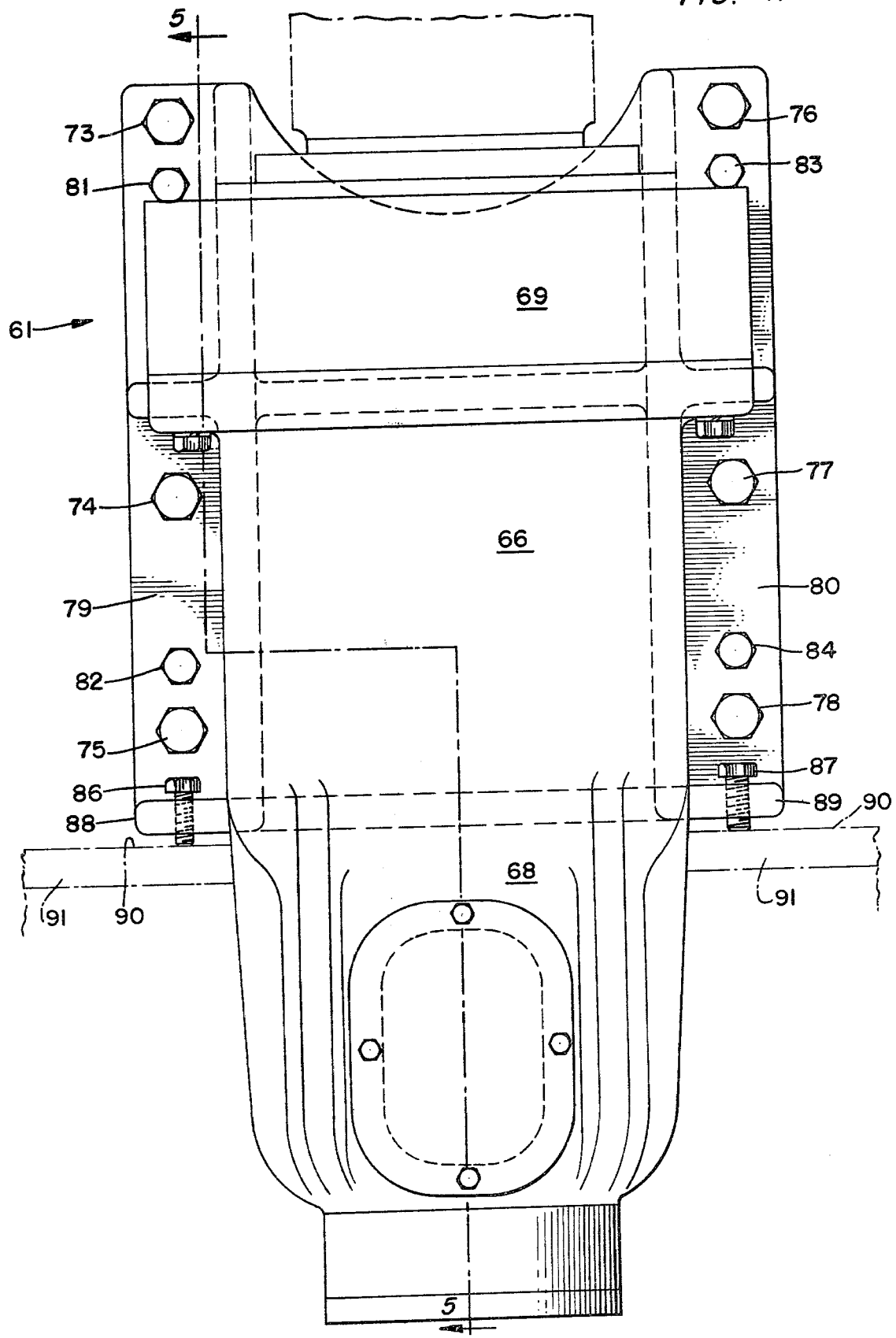
FIG. 4 is a vertical plan view of another embodiment of the present invention.

The drive unit shown in FIGS. 4 and 5 is rigidly secured or clamped to the upper frame by means of bolt and nut assemblies 73 through 78 which secure mounting bracket flanges 79 and 80 to vertical plate member 67 of the upper frame. Lateral displacement of the drive unit relative to the upper frame and correspondingly the pinion relative to the ring gear may be adjusted by set screws 81 through 84 threaded in openings in mounting bracket flanges 79 and 80, and having end portions engaging contact surface 85 of vertical plate member 63. Vertical displacement of the unit relative to the upper frame and correspondingly the pinion relative to the ring gear may be adjusted by set screws 86 and 87 which are threaded through bracket flange portions 88 and 89, having end portions engaging the upper surface 90 of a lower plate member 91 of the upper frame.

The mounting and adjustment procedures followed with respect to the embodiment shown in FIGS. 4 and 5 are substantially the same as described in connection with the embodiment shown in FIG. 3. While the adjusting screws provided in the embodiment shown in FIGS. 4 and 5, may be positioned at different locations, their function is identical to the function of the vertical displacement adjusting screws described in connection with the embodiment shown in FIG. 3.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In a machine having a lower frame, an upper frame having at least one upright wall section, rotatably mounted on said lower frame, and a ring gear mounted on said lower frame, an assembly for swinging said upper frame relative to said lower frame comprising a drive unit mountable on said upright wall section, having a pinion drivingly engageable with said ring gear, means for adjusting the lateral displacement of said drive unit relative to said upper frame, correspondingly adjusting the lateral displacement between the meshing teeth of said pinion and said ring gear, means for adjusting the vertical displacement of said drive unit relative to said upper frame, correspondingly adjusting the vertical displacement of said meshing teeth, providing proper alignment of said meshing teeth and full bearing contact therebetween, and means for rigidly securing said drive unit to said upper frame upon effecting proper alignment of said displacements between said drive unit and said upper frame.

2. An assembly according to claim 1 wherein said lateral displacement adjusting means comprises a set of set screws threaded into one of said drive unit and said upper frame, having end portions engageable with the other of said drive unit and said upper frame.

3. An assembly according to claim 2 wherein said securing means comprises a set of threaded fasteners.

4. An assembly according to claim 3 wherein each of said threaded fasteners comprises a bolt and nut assembly, said bolt extending through a horizontal, oversized opening in one of said drive unit and upper frame to permit said vertical displacement of said drive unit relative to said upper frame.

5. An assembly according to claim 1 wherein said vertical displacement adjusting means comprises a set of set screws threaded into one of said drive unit and said upper frame, having end portions engageable with the other of said drive unit and said upper frame.

6. An assembly according to claim 5 wherein said securing means comprises a set of threaded fasteners.

7. An assembly according to claim 6 wherein each of said threaded fasteners comprises a bolt and nut assembly, said bolt extending through a horizontal, oversized opening in one of said drive unit and said upper frame to permit said vertical displacement of said drive unit relative to said upper frame.

8. An assembly according to claim 5 wherein said drive unit includes at least one flange overlying a portion of said upper frame when said drive unit is mounted on said upper frame, and wherein said and at least one of said set screws is threaded into said flange, having an end portion engageable with said upper frame portion whereby upon rotating said set screw said drive unit will be displaced vertically relative to said upper frame.

9. An assembly according to claim 1 wherein said securing means comprises a set of threaded fasteners.

10. An assembly according to claim 9 wherein each of said threaded fasteners comprises a bolt and nut assembly, said bolt extending through a horizontal, oversized opening in one of said drive unit and said upper frame to permit said vertical displacement of said drive unit relative to said upper frame.

* * * * *